(12) United States Patent
Kitano et al.

(10) Patent No.: US 8,354,761 B2
(45) Date of Patent: Jan. 15, 2013

(54) TRANSFORMING DEVICE, ELECTRONIC APPARATUS, AND POWER SUPPLY SYSTEM INCLUDING THE SAME

(75) Inventors: Katsuya Kitano, Osaka (JP); Hiroki Koizumi, Hyogo (JP)

(73) Assignee: Panasonic Corporation, Osaka (JP)

( * ) Notice: Subject to any disclaimer, the term of this patent is extended or adjusted under 35 U.S.C. 154(b) by 280 days.

(21) Appl. No.: 12/942,203

(22) Filed: Nov. 9, 2010

(65) Prior Publication Data
US 2011/0156666 A1 Jun. 30, 2011

(30) Foreign Application Priority Data

Dec. 25, 2009 (JP) ................................. 2009-295359
Jun. 30, 2010 (JP) ................................. 2010-149703

(51) Int. Cl.
*H02J 1/00* (2006.01)
(52) U.S. Cl. .......................................... 307/86; 307/75

(58) Field of Classification Search .................... 307/52, 307/75, 80, 82, 86, 87
See application file for complete search history.

(56) References Cited

U.S. PATENT DOCUMENTS
8,188,618 B2 * 5/2012 Hori ............................... 307/80

FOREIGN PATENT DOCUMENTS
JP          5-83864          4/1993

* cited by examiner

*Primary Examiner* — Shawn Riley
(74) *Attorney, Agent, or Firm* — Hamre, Schumann, Mueller & Larson, P.C.

(57) ABSTRACT

When an electronic apparatus comes to a state of being capable of receiving electric power, an output voltage of an AC adaptor changes from a second voltage Vb to a first voltage Va and the change in voltage can be detected by an electronic apparatus. Due to this configuration, a structure that can detect the type of AC adaptor can be provided without adding any new contacts to a DC input terminal and to a DC output terminal.

4 Claims, 7 Drawing Sheets

TRANSFORMING DEVICE, ELECTRONIC APPARATUS, AND POWER SUPPLY SYSTEM INCLUDING THE SAME

BACKGROUND

1. Field

The present application relates to a transforming device, an electronic apparatus and a power supply system including such a transforming device and an electronic apparatus.

2. Description of Related Art

An electronic apparatus such as a notebook personal computer can operate with electric power supplied from a built-in battery or electric power supplied from a commercial power source via an AC adaptor. An AC adaptor is an apparatus that transforms a voltage (for example, 100 V) of a commercial power source to a voltage (for example, 16 V) suitable for an electronic apparatus such as a notebook personal computer.

The AC adaptor has an input terminal connectable to a commercial power source and an output terminal connectable to an input terminal provided to an electronic apparatus such as a notebook personal computer. The shape of the output terminals may vary among electronic apparatuses or may have a technical specification that is common among electronic apparatuses of different types. Even when the shapes of the output terminals are of a common technical specification among electronic apparatuses of different types, the rated power or the like may be different between the AC adaptor and the electronic apparatus. If an AC adaptor that has a different rating is connected to an electronic apparatus, the electronic apparatus may not operate normally or the electronic apparatus and/or the AC adaptor may break down. It is preferable therefore that the AC adaptor is used exclusively for a corresponding electronic apparatus.

As described above, for the purpose of preventing misconnection of the AC adaptor, it is possible to provide a means for identifying the type of the AC adaptor connected to the electronic apparatus side. In general, an output terminal of an AC adaptor includes a power source terminal and a ground terminal. By further providing the AC adaptor with an identification terminal and further providing the electronic apparatus with a terminal for AC adaptor identification, the type of AC adaptor can be identified at the electronic apparatus.

JP H05-83864 A discloses a power source device that includes a voltage detection terminal for detecting the voltage of a connected AC adaptor and that detects the terminal voltage at the voltage detection terminal so as to decide the type of the connected AC adaptor.

However, since the structure disclosed by JP H05-83864 A includes exclusive terminals at the terminals of the AC adaptor and of the electronic apparatus so as to decide the type of the AC adaptor, it is necessary to modify the shapes of the output terminal of the AC adaptor and the input terminal of the electronic apparatus. In other words, a structure of identifying the type of AC adaptor cannot be provided without modifying the shapes of the output terminal of the AC adaptor and/or the input terminal of the electronic apparatus.

SUMMARY

A transforming device of the present application includes an input terminal connectable to an external power source; a first voltage control portion that transforms a voltage at the input terminal to a voltage having a first voltage value; a second voltage control portion that transforms the voltage at the input terminal to a voltage having a second voltage value lower than the first voltage value; a switching portion capable of selecting any one of the first voltage control portion and the second voltage control portion; a current detection portion that detects a current value of a current outputted from the switching portion and controls switchover of the switching portion on the basis of a result of the detection; and an output terminal for outputting electric power outputted from the switching portion to the exterior. The current detection portion compares the current value of the current outputted from the switching portion with a reference value, and in a case where the current value is equal to or higher than the reference value, the current detection portion controls the switching portion to select the first voltage control portion. In a case where the current value is lower than the reference value, the current detection portion controls the switching portion to select the second voltage control portion.

An electronic apparatus of the present application includes an input terminal to which a transforming device can be connected; a voltage detection portion that detects a voltage value of the input terminal; and a control portion that identifies the type of the transforming device on the basis of the voltage value detected at the voltage detection portion. The control portion identifies the type of the transforming device, relying on whether the voltage value detected at the voltage detection portion includes plural voltage values different from each other or the voltage value detected at the voltage detection portion is kept constant.

An electronic apparatus of the present application includes an input terminal to which a transforming device can be connected; an apparatus current detection portion that detects a current value of a current inputted to the input terminal; a voltage detection portion that detects a voltage value of the input terminal; and a control portion that identifies the type of the transforming device on the basis of the current value detected at the apparatus current detection portion and the voltage value detected at the voltage detection portion. The control portion calculates a power value from the current value and the voltage value, and identifies the type of the transforming device, relying on whether the power value includes a plurality of values or the power value is kept constant.

A power supply system of the present application includes the above-described transforming device and the above-described electronic apparatus.

DETAILED DESCRIPTION OF THE INVENTION (Embodiment 1)

Figure 1:
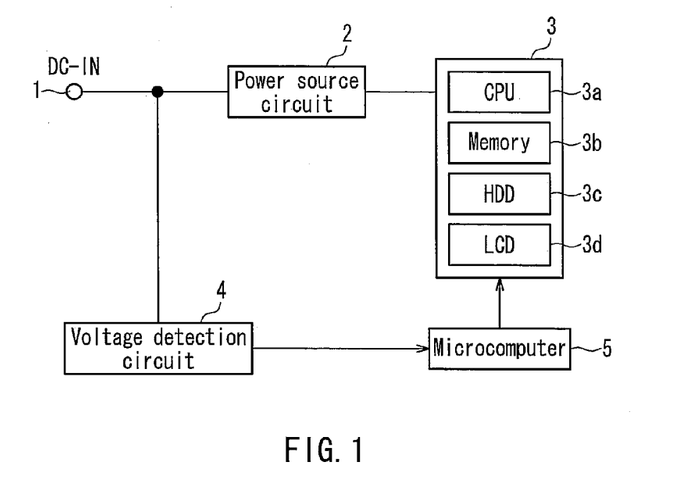
FIG. 1 is a block diagram showing an electronic apparatus according to Embodiment 1.

FIG. 1 is a block diagram showing an electronic apparatus according to the present embodiment. In the present embodiment, a notebook personal computer is described as an example of the electronic apparatus. The electronic apparatus as shown in FIG. 1 is an apparatus that operates on electric power supplied via an AC adaptor. The electronic apparatus as shown in FIG. 1 includes a DC input terminal 1, a power source circuit 2, a load 3, a voltage detection circuit 4 and a microcomputer 5.

The DC input terminal 1 is a terminal to which a DC output terminal (described later) of the AC adaptor can be connected. DC power is applied to the DC input terminal 1.

The power source circuit 2 is a circuit that converts the voltage of the DC power applied to the DC input terminal 1 to a voltage suitable for the load 3 and that supplies the electric power to the load 3. Namely, the power source circuit 2 has a function of a DC-DC converter.

The load 3 includes various devices such as a central processing unit (CPU) 3a, a memory 3b, a hard disk drive 3c, and a liquid crystal display (LCD) 3d. It should be noted that the devices included in the load 3 are those found a typical notebook personal computer, and the devices are not limited to this example.

The voltage detection circuit 4 is a circuit for detecting the voltage of the DC input terminal 1 and transmitting information on the voltage value to the microcomputer 5.

The microcomputer 5 identifies the type of the rated power of the AC adaptor on the basis of the information of the voltage value transmitted from the voltage detection circuit 4.

Figure 2:
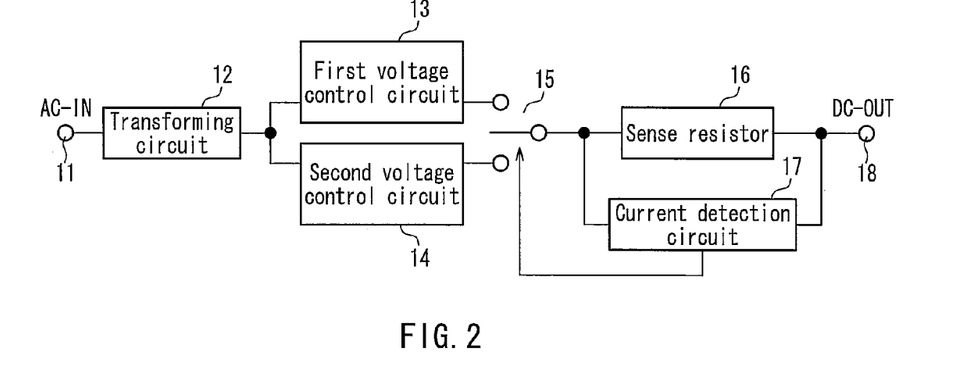
FIG. 2 is a block diagram showing an AC adaptor according to Embodiment 1.

FIG. 2 is a block diagram showing a transforming device according to the present embodiment. In the present embodiment, an AC adaptor is described as an example of the transforming device. The AC adaptor as shown in FIG. 2 is an AC adaptor capable of supplying electric power to a notebook personal computer, for example. The AC adaptor as shown in FIG. 2 includes an AC input terminal 11, a transforming circuit 12, a first voltage control circuit 13, a second voltage control circuit 14, a switch 15, a sense resistor 16, a current detection circuit 17 and a DC output terminal 18.

The AC input terminal 11 can be connected to a commercial power source. To the AC input terminal 11, AC power from the commercial power source is inputted.

The transforming circuit 12 is a circuit that transforms the voltage of the AC power inputted to the AC input terminal 11 to a predetermined DC voltage. Namely, the transforming circuit 12 has a function of AC-DC converter.

The first voltage control circuit 13 is a circuit that transforms the output voltage of the transforming circuit 12 to a first voltage Va. In the present embodiment, the first voltage Va is set to 16 V.

The second voltage control circuit 14 is a circuit that transforms the output voltage of the transforming circuit 12 to a second voltage Vb. In the present embodiment, the second voltage Vb is set to 10 V. Here, the values of the first voltage and the second voltage are not limited to this example, as long as the values are different from each other.

The switch 15 is connected electrically to either the output terminal of the first voltage control circuit 13 or the output terminal of the second voltage control circuit 14 due to the control by the current detection circuit 17.

The sense resistor 16 is connected between the switch 15 and the DC output terminal 18. The sense resistor 16 is used for detecting the current of the current detection circuit 17.

The current detection circuit 17 is connected in parallel between the input side and the output side of the sense resistor 16 so as to detect the current value on the basis of the potential difference between the input side and the output side of the sense resistor 16.

The DC output terminal 18 can be connected to the DC input terminal 1 of the electronic apparatus (see FIG. 1).

Figure 3:
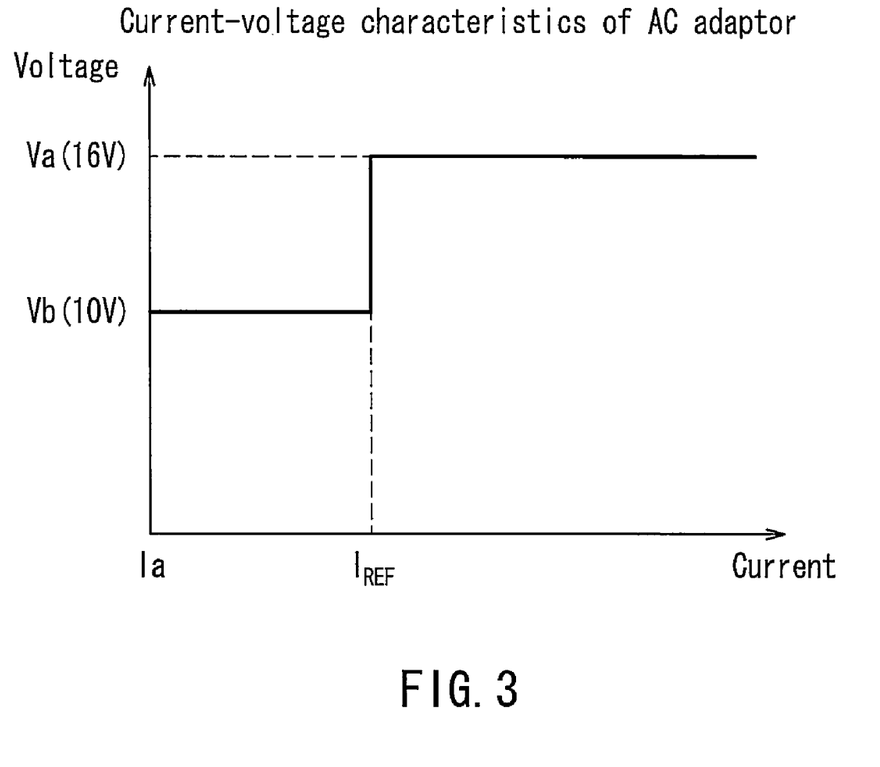
FIG. 3 is a graph showing voltage characteristics of the AC adaptor.
Figure 4:
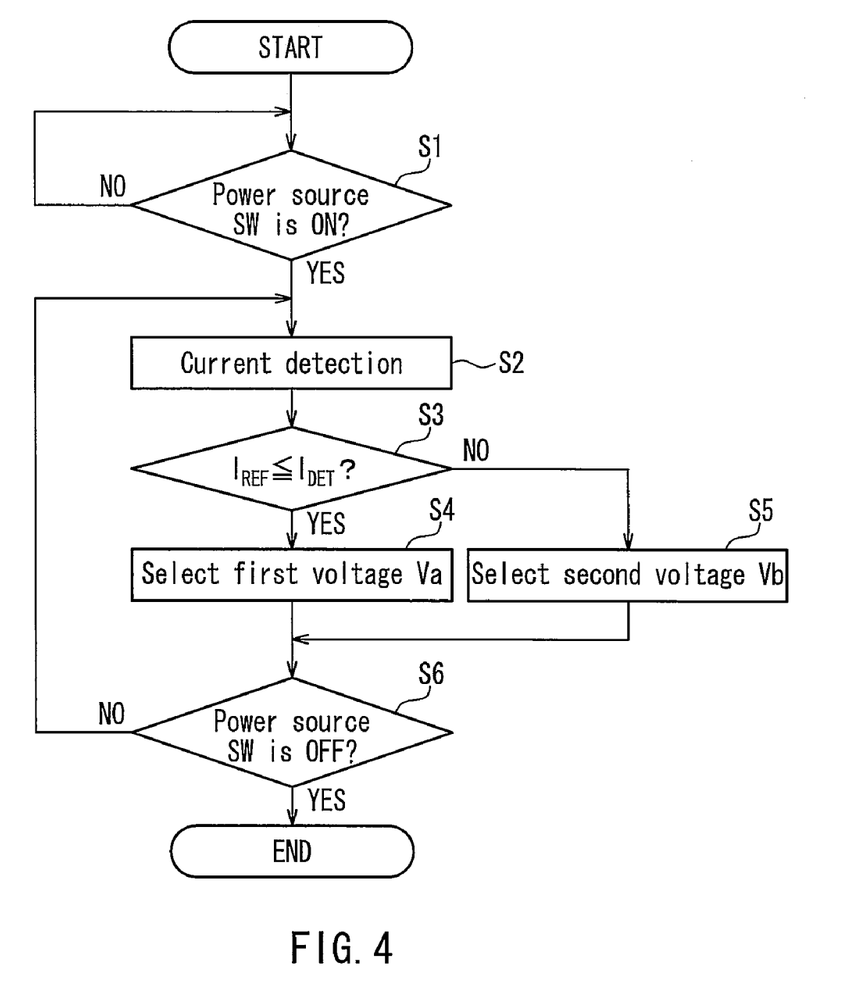
FIG. 4 is a flow chart showing an operation flow in the AC adaptor.
Figure 5:
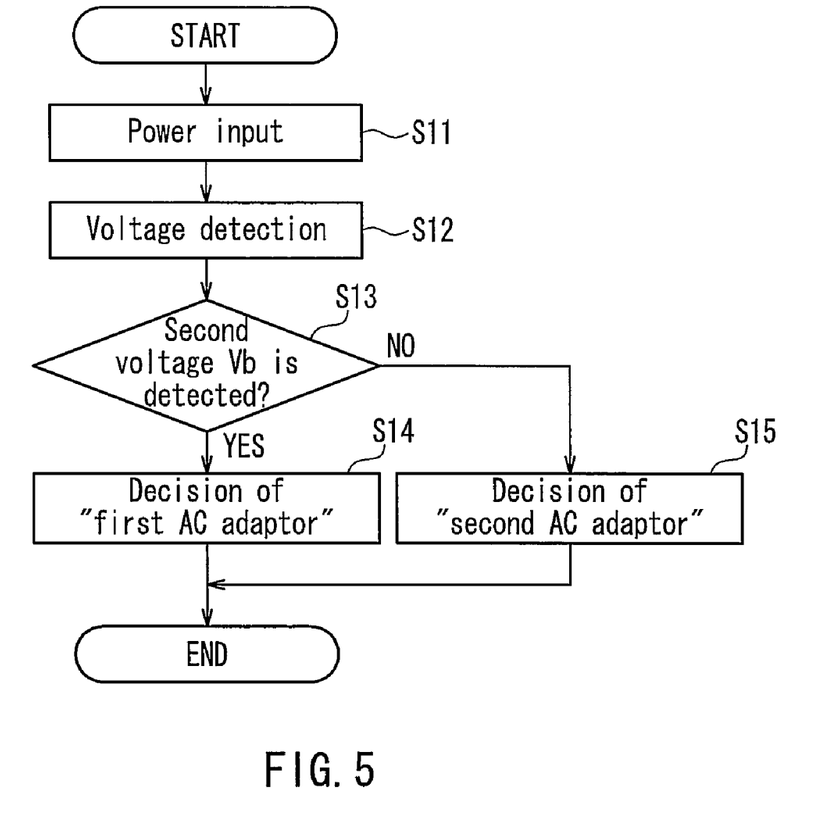
FIG. 5 is a flow chart showing an operation flow in a notebook personal computer.

FIG. 3 is a graph showing the current-voltage characteristics of the AC adaptor. Specifically, FIG. 3 shows the relationship between the current value detected at the current detection circuit 17 and the voltage at the DC output terminal 18. FIG. 4 shows an operation flow in the AC adaptor. FIG. 5 shows an operation flow in the electronic apparatus.

Hereinafter, the operations of the power supply system will be described.

First, the DC output terminal 18 of the AC adaptor as shown in FIG. 2 and the DC input terminal 1 of the electronic apparatus as shown in FIG. 1 are connected to each other.

Next, the AC input terminal 11 of the AC adaptor is connected to a commercial power source.

And when the electronic apparatus comes to a state of being capable of receiving electric power (YES decision in S1 of FIG. 4), the AC adaptor is supplied with electric power via the AC input terminal 11.

Here, the "state where the electronic apparatus is capable of receiving electric power" indicates, for example, a state where the power source switch in the electronic apparatus is switched from OFF to ON, a state where the electronic apparatus is capable of charging a rechargeable battery connected to the electronic apparatus itself, and a state where the loading current or the load state of the electronic apparatus has changed. The present embodiment refers to a state where the power source switch of the electronic apparatus has been switched from OFF to ON.

The transforming circuit 12 transforms the voltage of electric power inputted to the AC input terminal 11 to a predetermined voltage. The first voltage control circuit 13 transforms the output voltage of the transforming circuit 12 to the first voltage Va. The second voltage control circuit 14 transforms the output voltage of the transforming circuit 12 to the second voltage Vb. After the power source switch is switched from OFF to ON, the switch 15 is switched from the second voltage control circuit 14 side to the first voltage control circuit 13 side and thus the voltage at the output terminal of the switch 15 becomes 16 V. As a result, the voltage at the DC output terminal 18 also becomes 16 V.

Next, the current detection circuit 17 detects the current on the basis of the potential difference between the both ends of the sense resistor 16 (S2 in FIG. 4). At this time, the current detection circuit 17 controls the switching operation of the switch 15 (S3 in FIG. 4) on the basis of the characteristics as shown in FIG. 3. Specifically, the current detection circuit 17 compares the detected current value $I_{DET}$ and a reference current value $I_{REF}$. When deciding that the current value $I_{DET}$ is lower than the reference current value $I_{REF}$, the current detection circuit 17 controls the switch 15 so as to be connected to the second voltage control circuit 14 side (S5 in FIG. 4). When deciding that the current value $I_{DET}$ has exceeded the reference current value $I_{REF}$, the current detection circuit 17 controls the switch 15 so as to be connected to the first voltage control circuit 13 side (S4 in FIG. 4). Here, the "reference current value $I_{REF}$" is set to 100 mA in the present embodiment, though the value is not limited to this example.

After the power source switch of the electronic apparatus is switched from OFF to ON, the value of current running in the AC adaptor rises gradually. The current detection circuit 17 continues to compare the detected current value $I_{DET}$ and the reference current value $I_{REF}$. When the current value $I_{DET}$ exceeds the reference current value $I_{REF}$ (YES decision in S3 of FIG. 4), the current detection circuit 17 controls the switch 15 to be switched to the first voltage control circuit 13 side (S4 in FIG. 4). In the graph as shown in FIG. 3, when the current value $I_{DET}$ reaches the reference current value $I_{REF}$, the current detection circuit 17 switches the switch 15 to the first voltage control circuit 13 side. As a result, the voltage at the DC output terminal 18 becomes the first voltage (16 V).

Namely, in a case where the power source of the electronic apparatus has been switched from OFF to ON, at the AC adaptor of the present embodiment, the voltage of the DC output terminal 18 becomes the second voltage Vb and subsequently the voltage changes to the first voltage Va different from the second voltage Vb. On the other hand, the voltage at a DC output terminal of a conventional AC adaptor is kept to a certain value (for example, 16 V) even in a case where the power source of the electronic apparatus has been switched from OFF to ON.

Next, electric power based on the voltage changing as shown in FIG. 3 is inputted to the DC input terminal 1 of the electronic apparatus as shown in FIG. 1. The power source circuit 2 supplies the electric power inputted to the DC input terminal 1 to the respective devices included in the load 3 (S11 in FIG. 5).

The voltage detection circuit 4 detects the voltage at the DC input terminal 1, and transmits information of the voltage value to the microcomputer 5 (S12 in FIG. 5).

When detecting that the value of voltage transmitted from the voltage detection circuit 4 has changed as shown in FIG. 3, namely, detecting that a second voltage Vb exists (YES decision in S13 of FIG. 5), the microcomputer 5 decides that "the connected AC adaptor is the first AC adaptor" (S14 in FIG. 5).

On the other hand, when detecting that the voltage value is kept at the first voltage Va and is not changed (NO decision in S13 of FIG. 5), the microcomputer 5 decides that "the connected AC adaptor is the second AC adaptor" (S15 in FIG. 5).

Namely, the microcomputer 5 can decide the type of the connected AC adaptor on the basis of the change in the voltage value at the DC input terminal 11.

Here, the "first AC adaptor" can be regarded as an AC adaptor corresponding to electric power lower than the rated power for the electronic apparatus, for example. The "second AC adaptor" can be regarded as an AC adaptor corresponding to the rated power for the electronic apparatus, for example.

When deciding that the first AC adaptor is connected (S14 in FIG. 5), the microcomputer 5 restricts the operations and functions at the load 3. Namely, the microcomputer 5 conducts a control so that only functions operable with low power at the load 3 can be performed. When deciding that the second AC adaptor is connected (S15 in FIG. 5), the microcomputer 5 does not restrict the operations and functions at the load 3. Namely, the microcomputer 5 conducts a control for enabling all of the functions at the load 3. Though the present embodiment refers to a configuration for controlling the operations at the load 3 in accordance with the result of identification of the AC adaptor, the present application is not limited to this example. The control of the load 3 in accordance with the identification result is not essential.

The AC adaptor of the present embodiment is configured to change the output voltage from the second voltage Vb to the first voltage Va when the electronic apparatus comes to a state of being capable of receiving electric power. The electronic apparatus of the present embodiment is configured to be capable of detecting the change in the output voltage of the AC adaptor. According to the present embodiment, a system capable of detecting the type of AC adaptor can be provided without adding any new contacts to the DC input terminal 1 of the electronic apparatus and to the DC output terminal 18 of the AC adaptor. As a result, there is no necessity to modify the technical specifications of the power source terminals at the electronic apparatus and at the AC adaptor.

In the present embodiment, when the electronic apparatus comes to a state of being capable of receiving electric power, the output voltage of the AC adaptor is changed from the second voltage to the first voltage. In an alternative example, the voltage may be changed at the time of operation for overcurrent protection at the AC adaptor.

The transforming device of the present application is not limited to the AC adaptor in the present embodiment. The electronic apparatus of the present application is not limited to the notebook personal computer in the present embodiment. The power supply system of the present application is not limited to the system provided with the AC adaptor and the notebook personal computer in the present embodiment. The input terminal in a transforming device of the present application is not limited to the AC input terminal 11 in the present embodiment. The first voltage control portion of the present application is not limited to the first voltage control circuit 13 in the present embodiment. The second voltage control portion of the present application is not limited to the second voltage control circuit 14 in the present embodiment. The switching portion of the present application is not limited to the switch 15 in the present embodiment. The current detection portions of the present application are not limited to the sense resistor 16 and the current detection circuit 17 in the present embodiment. The output terminal of the present application is not limited to the DC output terminal 18 in the present embodiment. The input terminal in the electronic apparatus of the present application is not limited to the DC input terminal 1 in the present embodiment. The voltage detection portion of the present application is not limited to the voltage detection circuit 4 in the present embodiment. The control portion of the present application is not limited to the microcomputer 5 in the present embodiment. And the load of the present application is not limited to the load 3 in the present embodiment.

(Embodiment 2)

Figure 6:
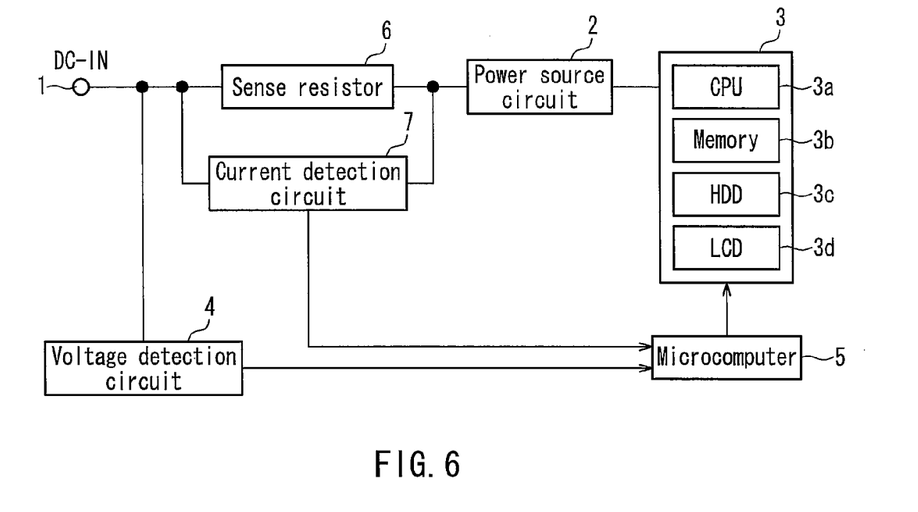
FIG. 6 is a block diagram showing an electronic apparatus according to Embodiment 2.
Figure 7:
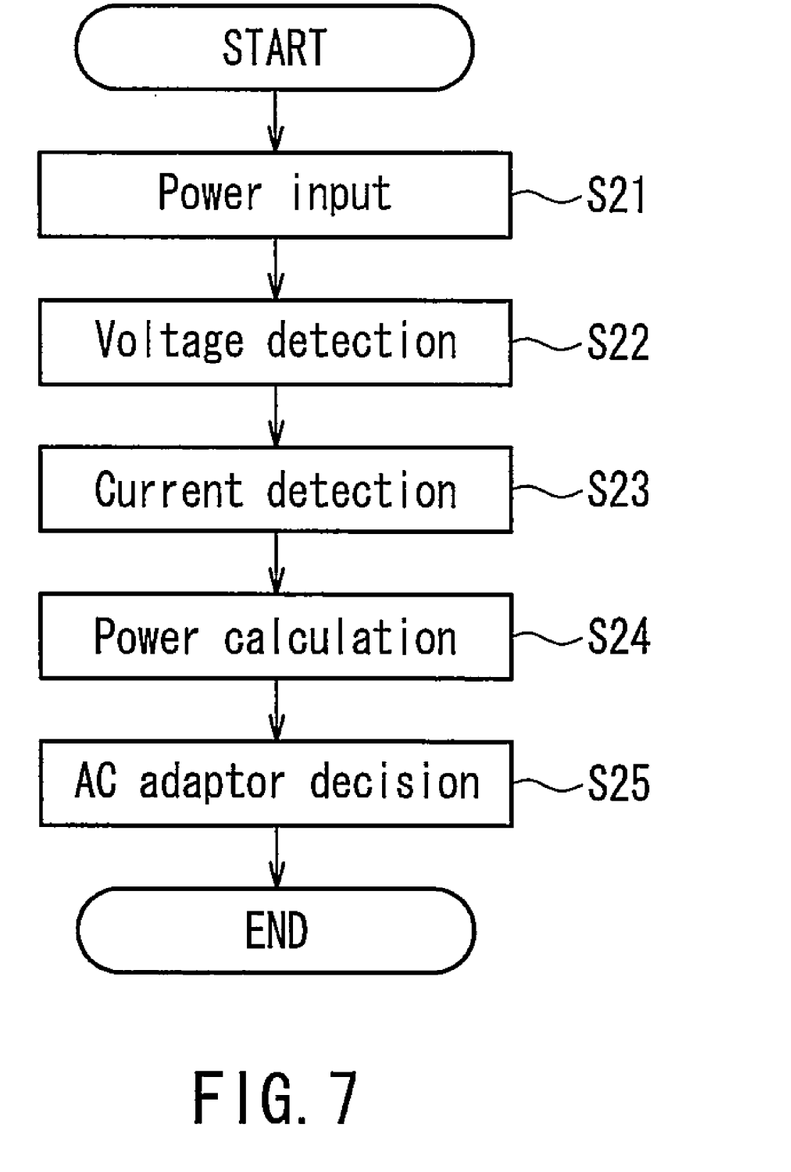
FIG. 7 is a flow chart showing an operation flow in a notebook personal computer.

FIG. 6 is a block diagram showing an electronic apparatus according to the present embodiment. The electronic apparatus as shown in FIG. 6 is configured as a notebook personal computer, for example. The electronic apparatus as shown in FIG. 6 operates on electric power supplied via an AC adaptor. The electronic apparatus as shown in FIG. 6 includes a DC input terminal 1, a power source circuit 2, a load 3, a voltage detection circuit 4, a microcomputer 5, a sense resistor 6, and a current detection circuit 7. FIG. 7 shows an operation flow of the electronic apparatus according to the present embodiment.

Since the AC adaptor in the present embodiment is configured similarly to the AC adaptor shown in FIG. 2, the explanation will not be repeated here. Since the current-voltage characteristics of the AC adaptor in the present embodiment are substantially the same as the characteristics as shown in FIG. 3, the explanation will not be repeated here. Further, since the operation flow of the AC adaptor in the present embodiment is substantially the same as the operation flow as shown in FIG. 4, the explanation will not be repeated here.

The DC input terminal 1 is a terminal to which a DC output terminal (described later) of the AC adaptor can be connected. DC power is applied to the DC input terminal 1.

The power source circuit 2 is a circuit that converts the voltage of the DC power applied to the DC input terminal 1 to a voltage suitable for the load 3 and that supplies the electric power to the load 3. Namely, the power source circuit 2 has a function of a DC-DC converter.

The load 3 includes devices such as a central processing unit (CPU) 3a, a memory 3b, a hard disk drive 3c, and a liquid crystal display (LCD) 3d. It should be noted that the devices included in the load 3 are those found in a typical notebook personal computer, and the devices are not limited to these examples.

The voltage detection circuit 4 is a circuit for detecting the voltage of the DC input terminal 1 and transmitting the voltage value to the microcomputer 5.

The microcomputer 5 calculates the power value (rated power) on the basis of the voltage value transmitted from the voltage detection circuit 4 and the current value transmitted from the current detection circuit 7, and identifies the type of the AC adaptor.

The sense resistor 6 is connected between the DC input terminal 1 and the power source circuit 2.

The current detection circuit 7 is connected in parallel between the input side and the output side of the sense resistor 6 so as to detect the current value on the basis of the potential difference between the input side and the output side of the sense resistor 6. The current detection circuit 7 transmits information of the detected current value to the microcomputer 5.

Hereinafter, the operations of the power supply system will be described with reference to FIGS. 2, 3, 4, 6 and 7.

First, the DC output terminal 18 of the AC adaptor as shown in FIG. 2 and the DC input terminal 1 of the electronic apparatus as shown in FIG. 6 are connected to each other.

Next, the AC input terminal 11 of the AC adaptor is connected to a commercial power source.

And when the electronic apparatus comes to a state of being capable of receiving electric power (YES decision in S1 of FIG. 4), the AC adaptor is supplied with electric power via the AC input terminal 11.

Here, the "state where the electronic apparatus is capable of receiving electric power" indicates, for example, a state where the power source switch in the electronic apparatus is switched from OFF to ON, a state where the electronic apparatus is capable of charging a rechargeable battery connected to the electronic apparatus itself, and a state where the loading current or the load state at the electronic apparatus has changed. The present embodiment refers to a state where the power source switch of the electronic apparatus has been switched from OFF to ON.

The transforming circuit 12 transforms the voltage of electric power inputted to the AC input terminal 11 to a predetermined voltage. The first voltage control circuit 13 transforms the output voltage of the transforming circuit 12 to the first voltage Va. The second voltage control circuit 14 transforms the output voltage of the transforming circuit 12 to the second voltage Vb. After the power source switch is switched from OFF to ON, the switch 15 is switched from the second voltage control circuit 14 side to the first voltage control circuit 13 side and thus the voltage at the voltage terminal of the switch 15 becomes 16 V. As a result, the voltage at the DC output terminal 18 also becomes 16 V.

Next, the current detection circuit 17 detects the current on the basis of the potential difference between the both ends of the sense resistor 16 (S2 in FIG. 4). At this time, the current detection circuit 17 controls the switching operation of the switch 15 (S3 in FIG. 4) on the basis of the characteristics as shown in FIG. 3. Specifically, the current detection circuit 17 compares the detected current value $I_{DET}$ and a reference current value $I_{REF}$. When deciding that the current value $I_{DET}$ is lower than the reference current value $I_{REF}$, the current detection circuit 17 controls the switch 15 so as to be connected to the second voltage control circuit 14 side (S5 in FIG. 4). When deciding that the current value Inn has exceeded the reference current value $I_{REF}$, the current detection circuit 17 controls the switch 15 so as to be connected to the first voltage control circuit 13 side (S4 in FIG. 4). Here, the "reference current value $I_{REF}$" is set to 100 mA in the present embodiment, though the value is not limited to this example.

After the power source switch of the electronic apparatus is switched from OFF to ON, the value of current running in the AC adaptor rises gradually. The current detection circuit 17 continues to compare the detected current value $I_{DET}$ and the reference current value $I_{REF}$. When the current value $I_{DET}$ exceeds the reference current value $I_{REF}$ (YES decision in S3 of FIG. 4), the current detection circuit 17 controls the switch 15 to be switched to the first voltage control circuit 13 side (S4 in FIG. 4). In the graph as shown in FIG. 3, after the current value $I_{DET}$ reaches the reference current value $I_{REF}$, the switch 15 is switched to the first voltage control circuit 13 side. As a result, the voltage at the DC output terminal 18 becomes the first voltage (16 V).

Namely, in a case where the power source of the electronic apparatus is switched from OFF to ON, at the AC adaptor of the present embodiment, the voltage of the DC output terminal 18 becomes the second voltage Vb and subsequently the voltage changes to the first voltage Va different from the second voltage Vb. On the other hand, the voltage at a DC output terminal of a conventional AC adaptor is kept to a certain value (for example, 16 V) even in a case where the power source of the electronic apparatus is switched from OFF to ON.

Next, electric power based on the voltage and current changing as shown in FIG. 3 is inputted to the DC input terminal 1 of the electronic apparatus. The power source circuit 2 supplies the electric power inputted to the DC input terminal 1 to the respective devices included in the load 3 (S21 in FIG. 7).

The voltage detection circuit 4 detects the voltage at the DC input terminal 1, and transmits information of the voltage value to the microcomputer 5 (S22 in FIG. 7).

The current detection circuit 7 detects the current value on the basis of the potential difference between the both ends of the sense resistor 6, and transmits the information of the detected current value to the microcomputer 5 (S23 in FIG. 7).

The microcomputer 5 multiplies the voltage value transmitted from the voltage detection circuit 4 and the current value transmitted from the current detection circuit 7, thereby calculating a power value (S24 in FIG. 7).

Here, in a case where the first AC adaptor is connected to the electronic apparatus, the voltage value detected by the voltage detection portion 4 has the voltage characteristic as shown in FIG. 3 (i.e., a characteristic where the second voltage Vb exists). On the other hand, in a case where the second AC adaptor is connected to the electronic apparatus, the voltage value detected by the voltage detection portion 4 becomes constant at the first voltage value Va (i.e., the second voltage Vb does not exist). The power value calculated by the microcomputer 5 on the basis of the voltage values will have characteristics different between a case of connecting the first AC adaptor and a case of connecting the second AC adaptor. In this manner, the microcomputer 5 can decide the type of AC adaptor with reference to the characteristics of the calculated power values (S25 in FIG. 7).

Just after the connection of the AC adaptor to the DC input terminal 1, since the electronic apparatus is in a light-load state, the current detection portion 7 cannot keep track of the accurate rated current of the AC adaptor. Namely, for keeping track of the rated current of the AC adaptor, it is necessary to put the electronic apparatus in an overload state. Therefore, the microcomputer 5 of the present embodiment monitors the current value detected at the current detection portion 7, and keeps track of the current value at the time the overcurrent protection of the electronic apparatus works, as the rated current of the AC adaptor.

Figure 8:
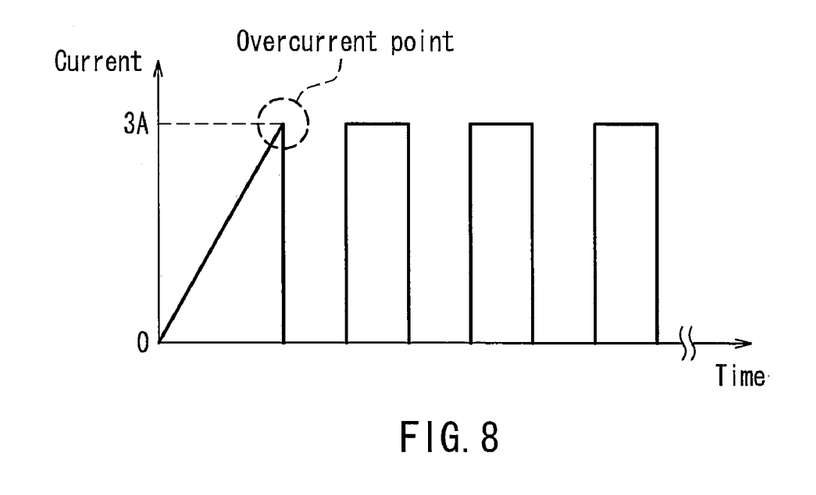
FIG. 8 is a characteristic graph showing a current change at the time an overcurrent protection functions.
Figure 9:
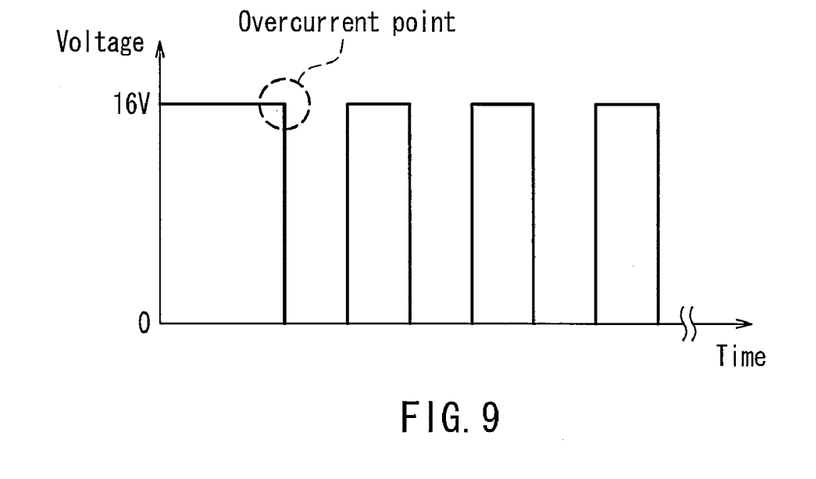
FIG. 9 is a characteristic graph showing a voltage change at the time an overcurrent protection functions.

FIG. 8 is a graph showing a change in the current value. FIG. 9 is a graph showing a change in the voltage value. As shown in FIG. 8, in the electronic apparatus, when a current over the rated value (for example, 3 A in the present embodiment) is drawn continuously from the AC adaptor, an overcurrent protection functions to transfer to a blocking oscillation control for suppressing increase of the current value. Accompanying this, the voltage also becomes a blocking oscillation as shown in FIG. 9. In the present embodiment, the microcomputer 5 keeps track of the current value during the overcurrent protection functions, regarding the current value as the rated current of the AC adaptor. More specifically, the microcomputer 5 keeps track of the current value just before the overcurrent protection functions and both the voltage and current are lowered temporarily, as the rated current of the AC adaptor. Due to the configuration of detecting the drops in the voltage and current so as to keep track of the rated current, the amount of information of the current value to be stored in the microcomputer 5 can be reduced. As a result, the memory in the microcomputer 5 can be downsized to lower the costs.

In the present embodiment, the drops of the voltage and the current are detected to keep track of the rated current. In a case where the memory in the microcomputer 5 is large, it is also possible to detect the current value at a predetermined time interval (for example, one second) at the current detection portion 7 and to store the detected current value in the microcomputer 5.

When deciding that the first AC adaptor is connected, the microcomputer 5 restricts the operations and functions at the load 3. Namely, the microcomputer 5 conducts a control so that only functions operable with low power at the load 3 can be performed. When deciding that the second AC adaptor is connected, the microcomputer 5 does not restrict the operations and functions at the load 3. Namely, the microcomputer 5 conducts a control for enabling all of the functions at the load 3. Though the present embodiment refers to a configuration for controlling the operations at the load 3 in accordance with the result of identification of the AC adaptor, the present application is not limited to this example. The control of the load 3 in accordance with the identification result is not essential.

In the present embodiment, when the electronic apparatus comes to a state of being capable of receiving electric power, the output voltage of the AC adaptor changes from the second voltage Vb to the first voltage Va, and in the electronic apparatus, the rated power of the AC adaptor can be detected on the basis of the voltage value and the current value. Thereby, a configuration enabling detection of the rating of the AC adaptor can be provided without adding any new contacts to the DC input terminal 1 and to the DC output terminal 18. Such a configuration can be provided without modifying the specifications of the power source terminals at the electronic apparatus and at the AC adaptor.

Further, according to the present embodiment for detecting the current value at the time the overcurrent protection functions in the electronic apparatus, the amount of information of the current value to be stored in the microcomputer 5 can be reduced, and thus the memory in the microcomputer 5 can be made small.

In the present embodiment, when the electronic apparatus comes to a state of being capable of receiving electric power, the output voltage of the AC adaptor is changed from the second voltage to the first voltage. In an alternative example, the voltage may be changed at the time of overcurrent protection at the AC adaptor.

The transforming device of the present application is not limited to the AC adaptor in the present embodiment. The electronic apparatus of the present application is not limited to the notebook personal computer in the present embodiment. The power supply system of the present application is not limited to the system provided with the AC adaptor and the notebook personal computer in the present embodiment. The input terminal in a transforming device of the present application is not limited to the AC input terminal 11 in the present embodiment. The first voltage control portion of the present application is not limited to the first voltage control circuit 13 in the present embodiment. The second voltage control portion of the present application is not limited to the second voltage control circuit 14 in the present embodiment. The switching portion of the present application is not limited to the switch 15 in the present embodiment. The power source current detection portions of the present application are not limited to the sense resistor 16 and the current detection circuit 17 in the present embodiment. The output terminal of the present application is not limited to the DC output terminal 18 in the present embodiment. The input terminal in an electronic apparatus of the present application is not limited to the DC input terminal 1 in the present embodiment. The voltage detection portion of the present application is not limited to the voltage detection circuit 4 in the present embodiment. The control portion of the present application is not limited to the microcomputer 5 in the present embodiment. The load of the present application is not limited to the load 3 in the present embodiment. And the apparatus current detection portions of the present application are not limited to the sense resistor 6 and the current detection circuit 7 in the present embodiment.

The present application is applied favorably to an electronic apparatus, and in particular, to an electronic apparatus to which an AC adaptor can be connected.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A transforming device comprising:
   an input terminal connectable to an external power source;
   a first voltage control portion that transforms a voltage at the input terminal to a voltage having a first voltage value;
   a second voltage control portion that transforms the voltage at the input terminal to a voltage having a second voltage value lower than the first voltage value;
   a switching portion capable of selecting any one of the first voltage control portion and the second voltage control portion;
   a current detection portion that detects a current value of a current outputted from the switching portion and controls switchover of the switching portion on the basis of a result of the detection; and
   an output terminal for outputting electric power outputted from the switching portion to the exterior,
   wherein the current detection portion compares the current value of the current outputted from the switching portion with a reference value, and in a case where the current value is equal to or higher than the reference value, the current detection portion controls the switching portion to select the first voltage control portion; and, in a case where the current value is lower than the reference value, the current detection portion controls the switching portion to select the second voltage control portion.

2. An electronic apparatus comprising:
an input terminal to which a transforming device can be connected;
a voltage detection portion that detects a voltage value of the input terminal; and
a control portion that identifies the type of the transforming device on the basis of the voltage value detected at the voltage detection portion,
wherein the control portion identifies the type of the transforming device, relying on whether the voltage value detected at the voltage detection portion includes plural voltage values different from each other or the voltage value detected at the voltage detection portion is kept constant.

3. An electronic apparatus comprising:
an input terminal to which a transforming device can be connected;
an apparatus current detection portion that detects a current value of a current inputted to the input terminal;
a voltage detection portion that detects a voltage value of the input terminal; and
a control portion that identifies the type of the transforming device on the basis of the current value detected at the apparatus current detection portion and the voltage value detected at the voltage detection portion,
wherein the control portion calculates a power value from the current value and the voltage value, and identifies the type of the transforming device, relying on whether the power value includes a plurality of values or the power value is kept constant.

4. A power supply system comprising a transforming device and an electronic apparatus,
the transforming device comprising:
an input terminal connectable to an external power source;
a first voltage control portion that transforms a voltage at the input terminal to a voltage having a first voltage value;
a second voltage control portion that transforms the voltage at the input terminal to a voltage having a second voltage value lower than the first voltage value;
a switching portion capable of selecting any one of the first voltage control portion and the second voltage control portion;
a current detection portion that detects a current value of a current outputted from the switching portion and controls switchover of the switching portion on the basis of a result of the detection; and
an output terminal for outputting electric power outputted from the switching portion to the exterior,
wherein the current detection portion compares the current value of the current outputted from the switching portion with a reference value, and in a case where the current value is equal to or higher than the reference value, the current detection portion controls the switching portion to select the first voltage control portion; and, in a case where the current value is lower than the reference value, the current detection portion controls the switching portion to select the second voltage control portion,
the electronic apparatus comprising:
an input terminal to which a transforming device can be connected;
a voltage detection portion that detects a voltage value of the input terminal; and
a control portion that identifies the type of the transforming device on the basis of the voltage value detected at the voltage detection portion,
wherein the control portion identifies the type of the transforming device, relying on whether the voltage value detected at the voltage detection portion includes plural voltage values different from each other or the voltage value detected at the voltage detection portion is kept constant.

* * * * *